United States Patent
Ishizuna et al.

(10) Patent No.: US 8,127,585 B2
(45) Date of Patent: Mar. 6, 2012

(54) PROCESS FOR MANUFACTURING OUTER RING MEMBER FOR CONSTANT-VELOCITY JOINT

(75) Inventors: Satoru Ishizuna, Utsunomiya (JP); Hiroaki Suzuki, Utsunomiya (JP); Junji Yoshida, Utsunomiya (JP); Hiroyuki Kawamura, Mooka (JP); Isao Nakata, Mooka (JP); Michie Hirane, Utsunomiya (JP); Sadaichi Takamatsu, Mooka (JP); Jun Noguthi, Sakuragawa (JP)

(73) Assignee: Honda Motor Co., Ltd., Tokyo (JP)

( * ) Notice: Subject to any disclaimer, the term of this patent is extended or adjusted under 35 U.S.C. 154(b) by 842 days.

(21) Appl. No.: 12/224,330

(22) PCT Filed: Jan. 18, 2007

(86) PCT No.: PCT/JP2007/050700
§ 371 (c)(1),
(2), (4) Date: Aug. 25, 2008

(87) PCT Pub. No.: WO2007/097141
PCT Pub. Date: Aug. 30, 2007

(65) Prior Publication Data
US 2009/0013746 A1    Jan. 15, 2009

(30) Foreign Application Priority Data
Feb. 27, 2006 (JP) .................................. 2006-050729
Dec. 22, 2006 (JP) .................................. 2006-346688

(51) Int. Cl.
*B21C 23/00* (2006.01)

(52) U.S. Cl. .................. 72/256; 72/53; 72/349; 72/356; 29/898.066

(58) Field of Classification Search .............. 72/53, 256, 72/340, 341, 352, 356, 358, 359, 348, 349; 29/898.042, 898.06, 898.066, 90.7
See application file for complete search history.

(56) References Cited

U.S. PATENT DOCUMENTS

| 6,055,838 | A | 5/2000 | Ohama et al. | |
|---|---|---|---|---|
| 6,606,895 | B2 * | 8/2003 | Sanada et al. | 72/334 |
| 7,000,319 | B2 * | 2/2006 | Iihara et al. | 29/898 |
| 7,090,729 | B2 * | 8/2006 | Oohama et al. | 148/246 |

FOREIGN PATENT DOCUMENTS

| JP | 59-124570 | 7/1984 |
|---|---|---|
| JP | 02-290640 | 11/1990 |
| JP | 11-179477 | 6/1999 |
| JP | 11-182568 | 7/1999 |

(Continued)

*Primary Examiner* — Edward Tolan
(74) *Attorney, Agent, or Firm* — Squire Sanders (US) LLP

(57) ABSTRACT

First shaped item with shaft part is produced by forward extrusion forming of work, and further, upset forming thereof is carried out to thereby obtain second shaped item with large-diameter part. Subsequently, backward extrusion forming of the second shaped item is carried out to thereby obtain third shaped item having not only cup part provided with ball rolling grooves but also circular diameter expansion portion provided at the mouth area of the inside wall of the cup part along the circumferential direction in such a fashion that the diameter is gradually expanded from the bottom side toward the opening side. Outer ring member for constant-velocity joint is obtained by further subjecting the third shaped item to low-temperature annealing treatment, shot blast treatment and lubricating chemical coating treatment, and thereafter to ironing forming.

5 Claims, 11 Drawing Sheets

FOREIGN PATENT DOCUMENTS

| | | | |
|---|---|---|---|
| JP | 11-236925 | | 8/1999 |
| JP | 2000-46061 | * | 2/2000 |
| JP | 2000-61576 | * | 2/2000 |
| JP | 2003-004061 | | 1/2003 |
| JP | 2003-083358 | | 3/2003 |
| WO | 2005/051566 | * | 6/2005 |

* cited by examiner

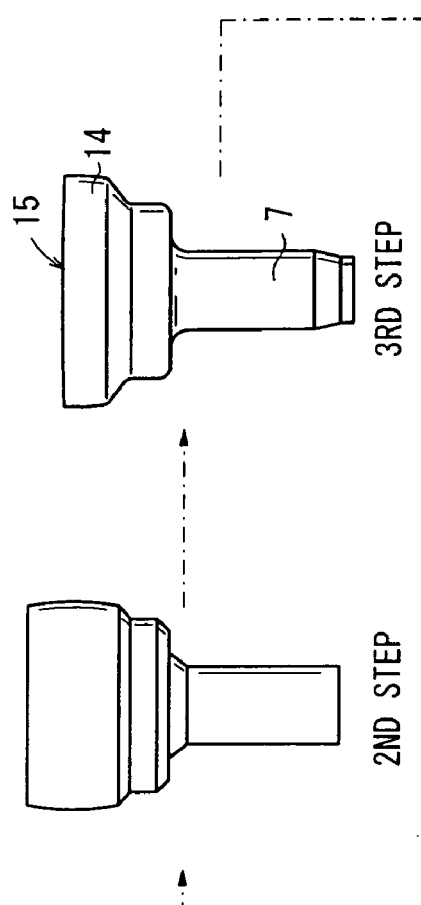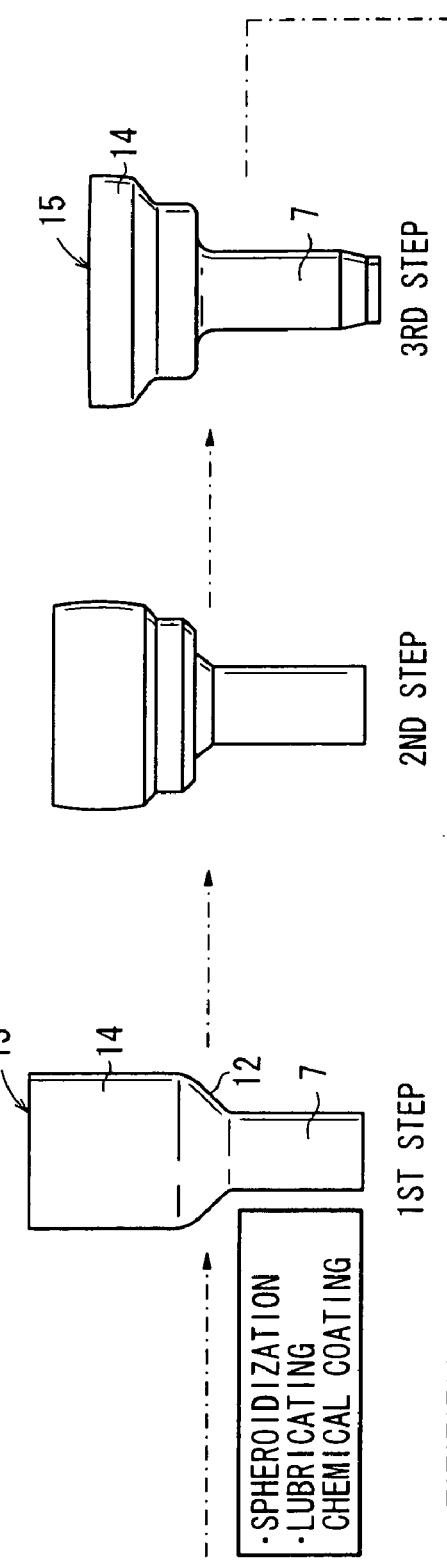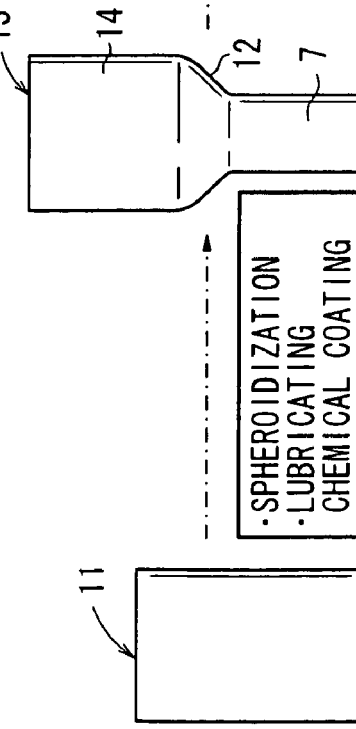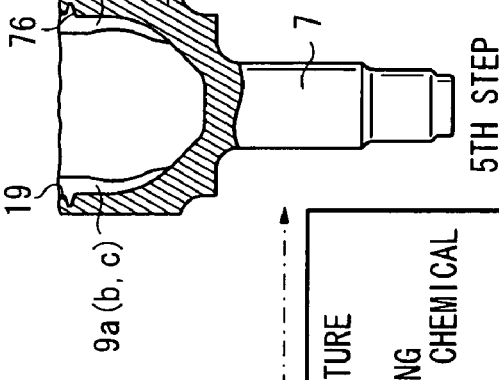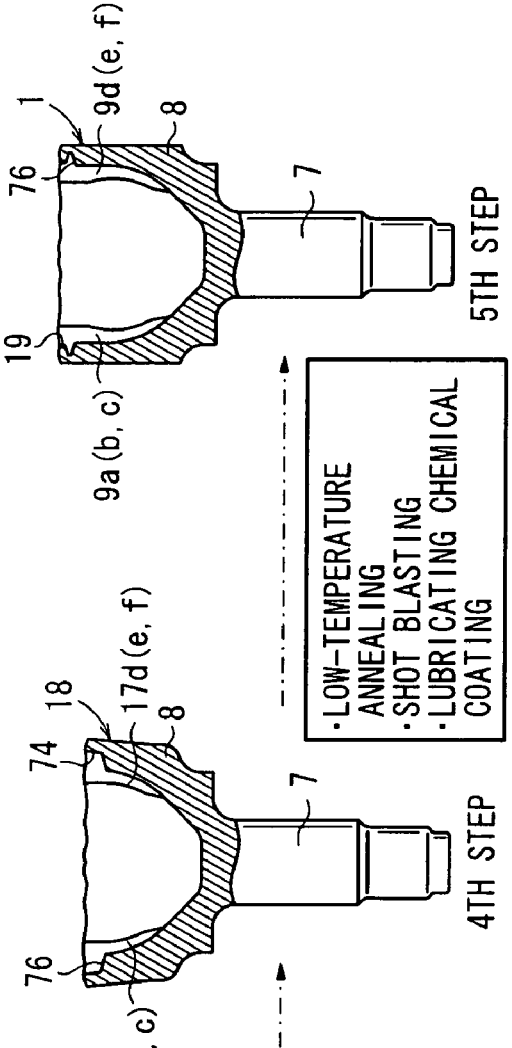

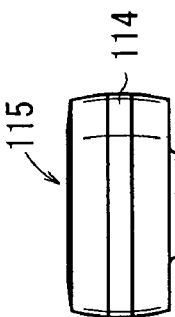
FIG. 8A
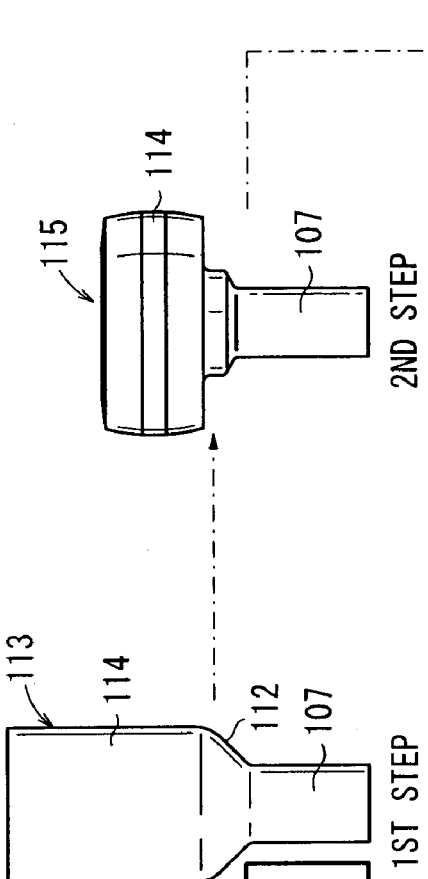
FIG. 8B
FIG. 8C
- SPHEROIDIZATION
- LUBRICATING CHEMICAL COATING
1ST STEP  2ND STEP
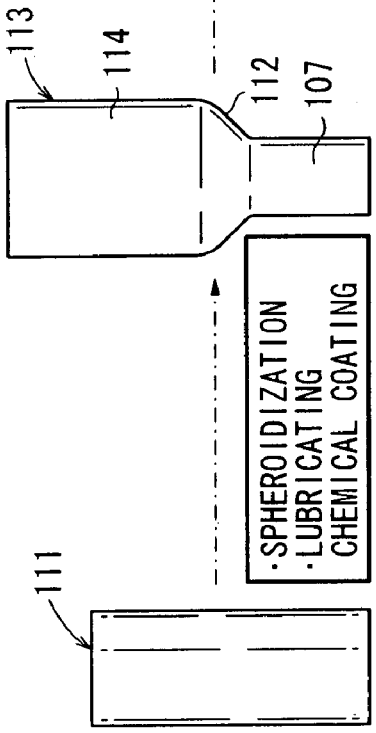
FIG. 8D
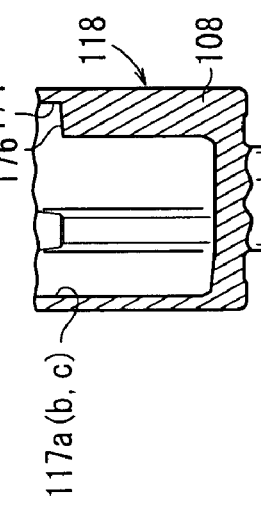
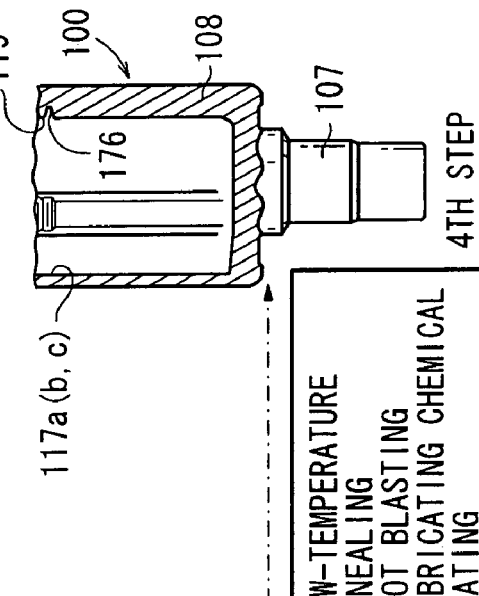
FIG. 8E
- LOW-TEMPERATURE ANNEALING
- SHOT BLASTING
- LUBRICATING CHEMICAL COATING
3RD STEP  4TH STEP

4TH STEP

2ND STEP

3RD STEP

- LOW-TEMPERATURE ANNEALING
- SHOT BLASTING
- LUBRICATING CHEMICAL COATING
- MARK REMOVAL

1ST STEP

- LOW-TEMPERATURE ANNEALING
- SHOT BLASTING
- LUBRICATING CHEMICAL COATING

- SPHEROIDIZATION
- LUBRICATING CHEMICAL COATING

PROCESS FOR MANUFACTURING OUTER RING MEMBER FOR CONSTANT-VELOCITY JOINT

TECHNICAL FIELD

The present invention relates to a method (process) of manufacturing an outer ring member for a constant velocity universal joint (constant-velocity joint) having a shank and a cup which are formed integrally with each other.

BACKGROUND ART

Motor vehicles such as automobiles or the like have a drive force transmitting mechanism for transmitting a drive force produced by an internal combustion engine to axles. The drive force transmitting mechanism includes, for example, a Birfield constant velocity universal joint and a tripod constant velocity universal joint that are connected to each other by a drive shaft.

The tripod constant velocity universal joint has an outer ring member disposed in a differential, not shown, and the Birfield constant velocity universal joint has an outer ring member for transmitting a rotational drive force to wheels, not shown.

The drive shaft has a distal end coupled to the outer ring member of the Birfield constant velocity universal joint by a plurality of rolling balls.

FIG. 10 shows an overall schematic perspective view of an outer ring member 1 for a Birfield constant velocity universal joint. The outer ring member 1 is made of carbon steel and has a shank (shaft) 7 and a cup 8 formed integrally with each other.

The cup 8 has six ball rolling grooves 9a through 9f defined in an inner wall surface at circumferentially spaced angular intervals. The ball rolling grooves 9a through 9f serve to allow balls (not shown) to roll therein, and extend along the inner wall surface of the outer ring member 1 nearly to a terminal end of the cup 8. The shank 7 has a positioning central hole, not shown, defined in an end thereof.

The outer ring member 1 is manufactured by cold forging as follows: First, as shown in FIG. 9A, a cylindrical workpiece 11 which is slightly greater in diameter than the shank 7 is pretreated. Specifically, the workpiece 11, which is made of carbon steel, is spheroidized (annealed) to produce the cementite in the form of globules in the metal structure, and then a lubricating chemical coating is formed on its surface by a bonderizing process. In the general cold forging process, a coating of zinc phosphate is often used as the lubricating chemical coating.

Then, a first forging process (forward extrusion) is performed on the workpiece 11 with the lubricating chemical coating thereon by a first forging die, not shown. Specifically, an end of the workpiece 11 is pressed toward a cavity defined in the first forging die and having a diameter smaller than the workpiece 11. The other end of the workpiece 11 is thus pressed into the cavity, producing a first form 13 having a reduced-diameter portion 12 tapered toward the other end and a shank 7, as shown in FIG. 9B.

Then, a second forging process (upsetting) is performed on the first form 13. Specifically, using a second forging die, not shown, only a large-diameter portion 14 of the first form 13 is progressively compressed to increase its diameter, producing a second form 15, as shown in FIG. 9C.

The second form 15 is then subjected to a low-temperature annealing process for removing stresses, a shot blasting process for removing oxide scales produced by the low-temperature annealing process, and a bonderizing process for forming a lubricating chemical coating made of zinc phosphate or the like on the outer surface of the second form 15.

After the second form 15 is thus treated, the second form 15 is placed in the cavity of a third forging die, not shown, and is subjected to a third forging process (backward extrusion) to extend the large-diameter portion 14 which has increased in diameter, form ball rolling grooves 17a through 17f in the large-diameter portion 14, and form a cup 8.

Specifically, a punch, not shown, having protrusions for forming the ball rolling grooves 17a through 17f is held against the center of an end face of the cup 8, and the distal end of the shank 7 is pressed to displace the second form 15 toward the punch. The second form 15 with the large-diameter portion 14 surrounded by the inner wall surface of the cavity is compressed by the punch, thereby extending the large-diameter portion 14 and forming ball rolling grooves 17a through 17f that are complementary in shape to the protrusions of the punch in the large-diameter portion 14. As a result, a third form 18 shown in FIG. 9D is produced.

Then, a low-temperature annealing process is performed on the third form 18 to soften the third form 18, and thereafter a lubricating chemical coating is formed thereon again by the shot blasting process and the bonderizing process. These processes are effective to prevent the inner surface of the cup 8 from cracking under tensile stresses at the time a next ironing process is performed.

Before the final ironing process is performed, a mark removing process is carried out to remove an annular ridge 19a as a mark formed on the edge of the inner surface of the cup 8 of the third form 18 and integrally projecting radially inwardly.

Specifically, in the shot blasting process performed on the third form 18, a projected mark is formed in the mouth of the inner wall surface in the opening of the cup 8 by steel balls ejected at a high speed and stirred. Such a mark is also formed when the form treated by the various forging processes falls into a storage container and hits other forms. The mark comprises the annular ridge 19a formed on the edge of the inner surface of the cup 8 and slightly projecting radially inwardly (see FIG. 11). If the projecting annular ridge 19a is not removed, then it will be difficult for an ironing punch, not shown, to be smoothly inserted into the cup 8 in the next process.

According to the mark removing process, the third form 18 is set on a mark removing machine (not shown) having a correcting punch, and the annular ridge 19a as the mark formed on the edge of the inner surface of the cup 8 is removed by the correcting punch.

Finally, an ironing process (final sizing process) for finishing the form to a final product shape, i.e., a fourth forging process, is performed by a fourth forging die, not shown, producing an outer ring member 1 for a Birfield constant velocity universal joint (see FIG. 9E).

After all the forging processes for forming the outer ring member 1 are finished, a cutting process such as lathing or the like is performed on the end face of the mouth of the cup 8 to deburr the cup 8, thereby producing an outer ring member 1 (see FIG. 10) for a Birfield constant velocity universal joint as a completed product.

Constant velocity universal joints and methods of manufacturing them according to the background art are disclosed in the following Patent Documents:

Japanese Laid-Open Patent Publication No. 11-236925 discloses a manufacturing method for forming, by plastic working, a beveled portion fully circumferentially on an inner circumferential surface of the mouth in the opening of the cup, without the need for a beveling process performed as a cutting process after the final ironing process.

Japanese Laid-Open Patent Publication No. 02-290640 discloses that a steel material which is of good formability and has a component ratio suitable for induction hardening is devised, and the steel material is upset at a possible forming rate.

Japanese Laid-Open Patent Publication No. 11-179477 discloses an ironing apparatus which is capable of reliably holding a shank and a cup in accurate coaxial alignment with each other and effectively keeping the inner surface of the cup accurate.

Japanese Laid-Open Patent Publication No. 11-182568 discloses a constant velocity universal joint having beveled portions produced only by plastic working on ridges provided at the boundaries between the inner circumferential surface of a cup and ball grooves.

Japanese Laid-Open Patent Publication No. 2003-083358 discloses a manufacturing method for ironing a form continuously before the form is work-hardened, without the need for a low-temperature annealing process and a lubricating chemical coating process on the form.

The above-mentioned forging method for producing a Birfield constant velocity universal joint according to the background art has a problem concerned with a mark removing process for removing a mark produced by shot blasting, etc. Since the diameter of a cup varies from automobile type to automobile type, the correcting punch of the mark removing machine has to be replaced depending on the automobile type involved. There are many replacement parts and a lot of labor is required for replacing them. As a result, the production efficiency is lowered, the manufacturing process is complicated, and the manufacturing cost is increased.

DISCLOSURE OF THE INVENTION

It is a general object of the present invention to provide a method of manufacturing an outer ring member for a constant velocity universal joint, which dispenses with a mark removing operation for increased production efficiency and shortens a manufacturing process for a reduced manufacturing cost.

According to the present invention, a backward extrusion process is performed to produce a form having a cup with grooves defined therein and an annular large-diameter portion which is circumferentially formed in a mouth of an inner wall surface of the cup and spreads progressively from a bottom toward an opening thereof. Then, an ironing process is performed on the cup of the form to produce an outer ring member of a constant velocity universal joint.

According to the present invention, though a projecting annular ridge is formed as a mark by a scale removing process (e.g., a shot blasting process) performed on the form, since the annular large-diameter portion has been formed in the mouth of the inner wall surface of the cup in the preceding step of performing the backward extrusion process, an ironing punch can be inserted into the opening of the cup in the next step without contacting the annular ridge. Consequently, a mark removing process which has heretofore been performed is dispensed with. Stated otherwise, the ironing process can be performed while the annular ridge remains to be left as the mark.

According to the present invention, inasmuch as the mark removing process which has heretofore been performed is dispensed with, the production efficiency can be increased and the manufacturing process is shortened for reducing the manufacturing cost.

BRIEF DESCRIPTION OF THE DRAWINGS

FIGS. 6A through 6F are views illustrative of a warm forging process to which the method of manufacturing an outer ring member for a Birfield constant velocity universal joint according to the embodiment is applied;

FIGS. 8A through 8E are illustrative views of a process of forging a workpiece, to which the method of manufacturing an outer ring member for a tripod constant velocity universal joint according to the other embodiment is applied;

BEST MODE FOR CARRYING OUT THE INVENTION

Figure 1:
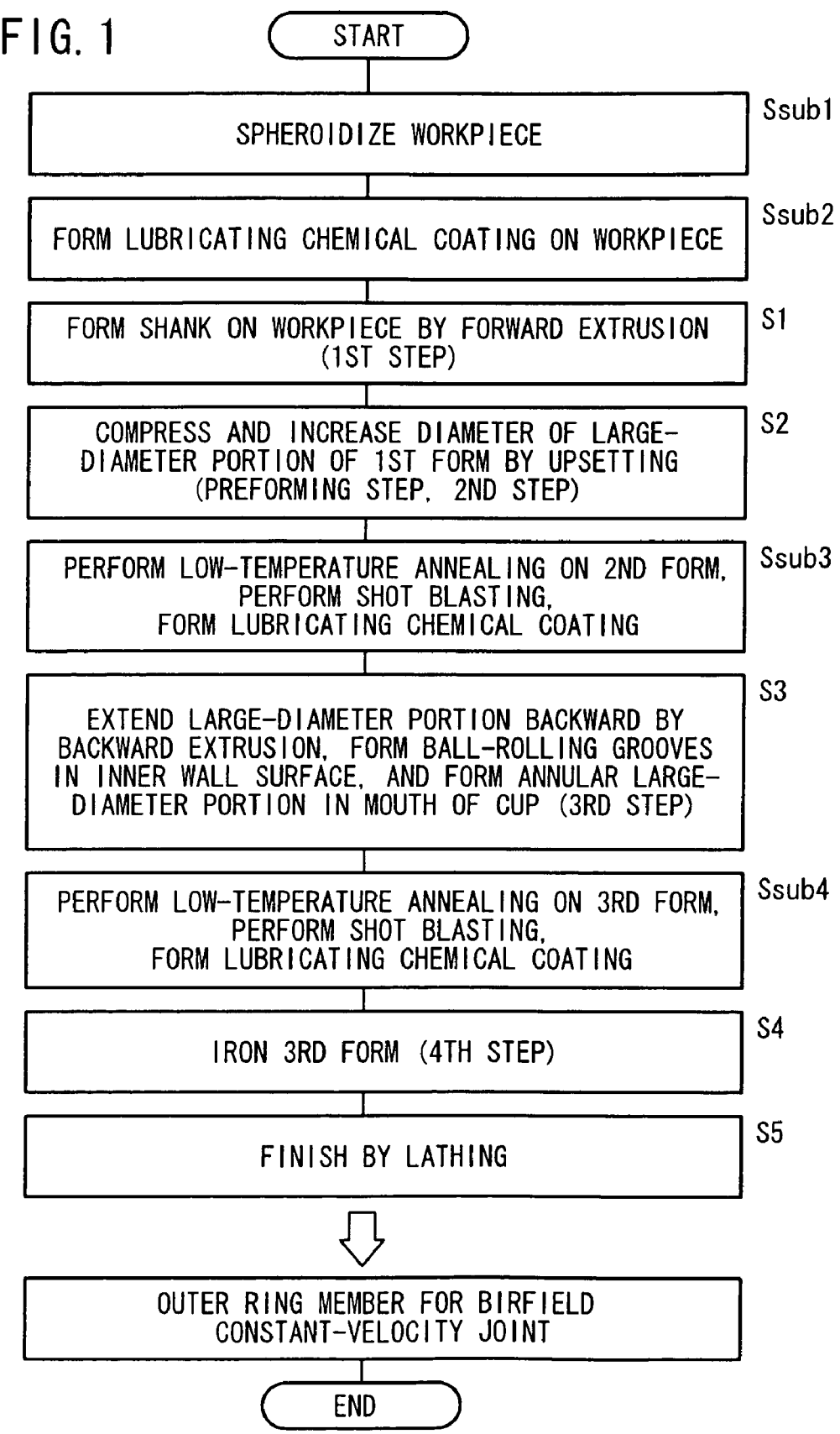
FIG. 1 is a flowchart of a method of manufacturing an outer ring member for a Birfield constant velocity universal joint according to an embodiment of the present invention.

In a method of manufacturing an outer ring member for a constant velocity universal joint according to an embodiment of the present invention, as shown in a flowchart of FIG. 1, a workpiece 11 in the form of a cylinder of carbon steel is cold-forged four times and finished (machined) by lathing or the like into an outer ring member 1 (see FIG. 10) for a Birfield constant velocity universal joint. Those components which are identical to the components shown in FIGS. 9A through 9E, 10, and 11 are denoted by identical reference characters, and will not be described in detail below.

In first preparatory step Ssub1, a workpiece 11 (see FIG. 2A) cut into a cylinder having a given length is spheroidized (annealed). The workpiece 11 is softened thereby, making it easy to perform first through fourth cold forging steps described below.

In second preparatory step Ssub2, a lubricating chemical coating is formed on the workpiece 11. Specifically, a lubricating chemical coating made of zinc phosphate or the like is formed on the surface of the workpiece 11 to impart a lubricating property to the workpiece 11 by bonderizing. More specifically, the workpiece 11 may be immersed in a solvent with zinc phosphate or the like dissolved therein for a given period of time to form a lubricating chemical coating thereon.

In first cold forging step S1, forward extrusion is performed on the workpiece 11 having the lubricating chemical coating thereon. Specifically, the workpiece 11 is loaded in a workpiece holder of a first forging die having a shank forming cavity, not shown. The shank forming cavity is smaller in diameter than the workpiece 11, with a tapered surface being provided between the shank forming cavity and the workpiece holder.

Then, an end of the workpiece 11 is pressed toward the shank forming cavity. When the workpiece 11 is thus pressed, the other end of the workpiece 11 is pressed into the shank forming cavity. As a result, a first form 13 (see FIG. 2B) is produced which has a reduced-diameter portion 12 tapered toward the other end and a shank 7.

Since the portion of the workpiece 11 which is loaded in the workpiece holder is almost not plastically deformed, the first form 13 has a large-diameter portion 14 whose diameter corresponds to the diameter of the workpiece 11.

Then, after the first form 13 is preformed (see FIG. 2C), the preform is upset in second cold forging step S2. Specifically, the preform is loaded in the cavity of a second forging die, not shown. At this time, the shank 7 is inserted in a shank holder, not shown, of the second forging die.

While the distal end of the shank 7 inserted in the shank holder is being supported by a stopper (not shown), the large-diameter portion 14 of the preform is pressed by a punch. When the large-diameter portion 14 is pressed, it is compressed and increased in diameter, producing a second form 15 (see FIG. 2D).

After second cold forging step S2 is finished, the second form 15 is subjected to a low-temperature annealing process for removing stresses from the second form 15, a shot blasting process (scale removing process) for removing oxide scales, etc. produced by the low-temperature annealing process, and a bonderizing process for forming a lubricating chemical coating made of zinc phosphate or the like on the outer surface of the second form 15, in third preparatory step Ssub3. These various processes make it possible for the second form 15 to be easily plastically deformed.

Figure 3:
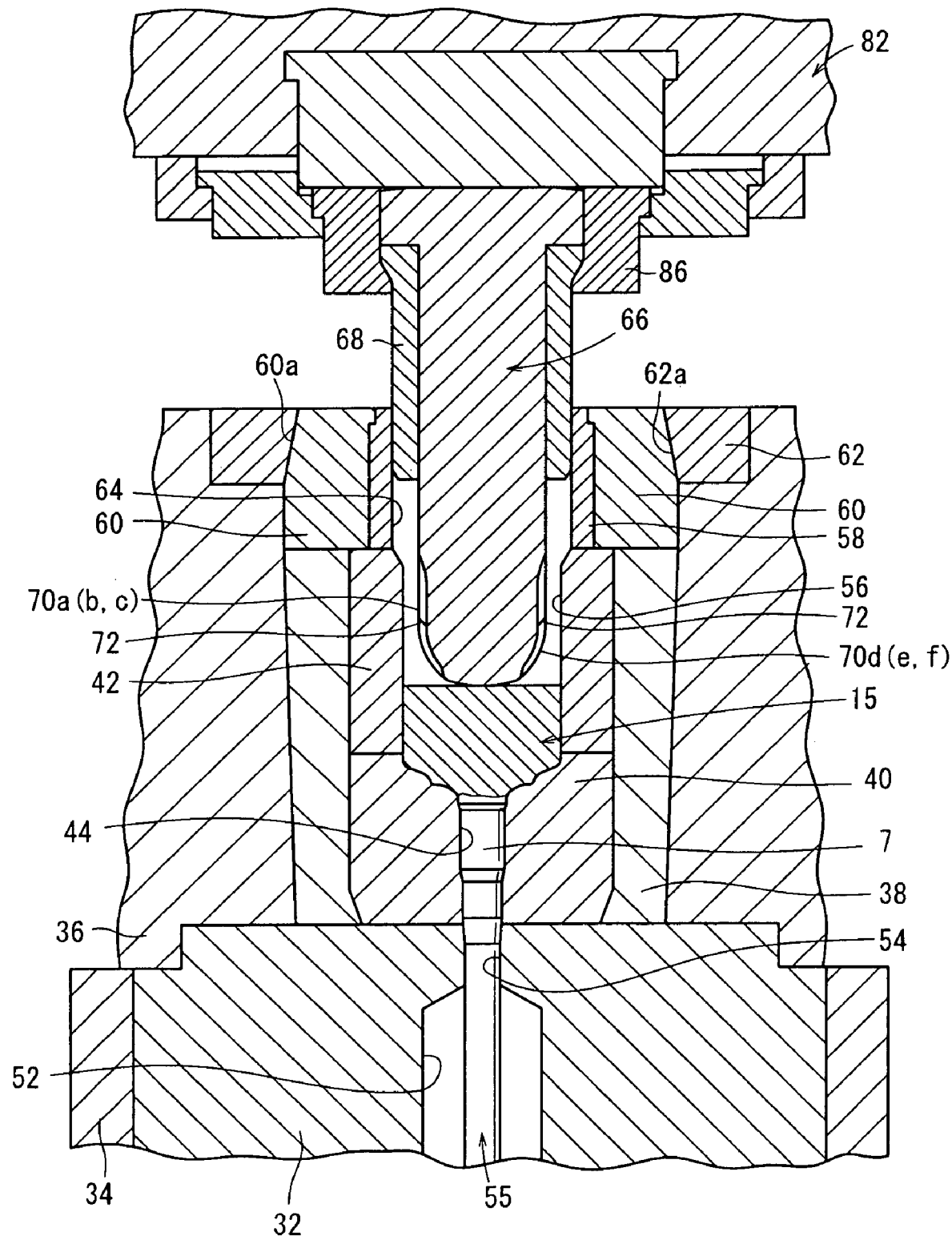
FIG. 3 is a schematic vertical cross-sectional view of a forging die apparatus for performing a third cold forging process of the method of manufacturing an outer ring member for a Birfield constant velocity universal joint according to the embodiment of the present invention.

Thereafter, third cold forging step S3 is carried out using a forging die apparatus 30 shown in FIG. 3.

Structural details of the forging die apparatus 30 will generally be described below.

The forging die apparatus 30 has a first die plate 32 and a second die plate 34. A thick pressing ring 36 is fixedly mounted on the first die plate 32 by a fixing member, not shown.

The pressing ring 36 has a hole defined therein in which a hollow cylindrical insert member 38 is fitted. The insert member 38 has an outside diameter slightly greater than the inside diameter of the pressing ring 36. In other words, the insert member 38 is fitted in the hole of the pressing ring 36 by way of an interference fit.

A lower die 40 having an axial dimension smaller than the insert member 38 is disposed in the insert member 38, and an upper die 42 is joined to the upper end of the lower die 40 such that the upper end of the upper die 42 lies flush with the upper end of the insert member 38. The lower die 40 has a shank insertion region 44 for inserting the shank 7 of the second form 15 therein.

The first die plate 32 has a through hole 54 defined therein vertically below the shank insertion region 44 in communication with a hole 52 defined in the first die plate 32. A knockout pin 55 which can be moved upwardly or downwardly is disposed in the through hole 54.

The upper die 42 has a cup forming cavity 56 defined therein for forming the large-diameter portion 14 of the second form 15. Naturally, the cup forming cavity 56 has a diameter greater than the shank insertion region 44.

A first ring 58 is joined to the upper end surface of the upper die 42. A second ring 60 is joined to the upper end surface of the insert member 38 and fitted over the first ring 58. A third ring 62 is joined to an annular recess defined in the pressing ring 36 to receive the third ring 62 and fitted over the second ring 60.

The third ring 62 is fastened to the pressing ring 36 so as to fit over the second ring 60, thereby causing a tapered surface 62a of the third ring 62 to frictionally contact an inversely tapered surface 60a of the second ring 60. As a result, forces are applied to press the first ring 58 and the second ring 60 downwardly.

The first ring 58 has a hole 64 defined therein, and a punch 66 is inserted through the hole 64. The punch 66 has a side circumferential wall surface over which there is fitted a guide sleeve 68 in the form of a hollow cylinder of metal for smoothly elevating or lowering the punch 66. Thus, the guide sleeve 68 is interposed between the first ring 58 and the punch 66.

The punch 66 has six ridges 70a through 70f on the outer circumferential surface of a distal end thereof which are circumferentially spaced at angular intervals of 60° and extend a given length in the axial direction of the punch 66. The ridges 70a through 70f of the punch 66 will form ball rolling grooves 17a through 17f.

Figure 4:
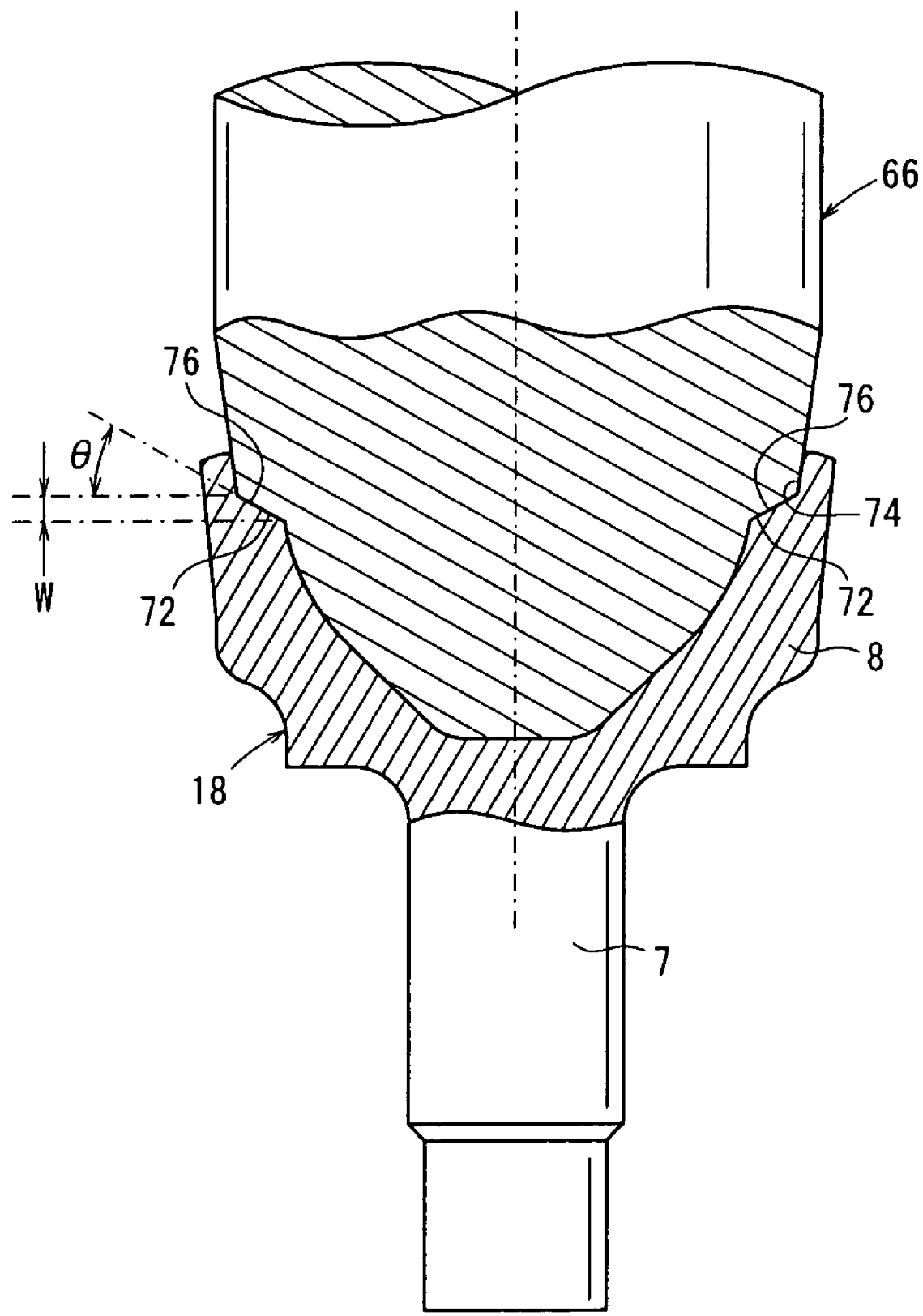
FIG. 4 is an enlarged vertical cross-sectional view, partly omitted from illustration, showing a third form produced by a punch of the forging die apparatus shown in FIG. 3.

As shown in FIG. 4, the punch 66 has a tapered surface 72 on its outer circumferential surface which is spaced upwardly from the distal end (lower end) thereof by a given distance. The tapered surface 72 extends circumferentially and is progressively greater in diameter radially outwardly. The tapered surface 72 serves to form an annular large-diameter portion 76 in the mouth of an inner wall surface of the cup 8 to be described later.

The tapered surface 72 is inclined at an angle θ (an angle to a straight line perpendicular to the axis of the punch 66) which may be set to a value in the range from about 25 degrees to 45 degrees. If the angle δ of inclination of the tapered surface 72 is smaller than 25 degrees, then the annular large-diameter portion 76 is formed below the mouth of the cup 8, causing the cup 8 as a product to suffer a reduction in the standard dimensional accuracy. If the angle θ of inclination of the tapered surface 72 is greater than 45 degrees, then stresses tend to concentrate on the tapered surface 72 of the punch 66, making the punch 66 susceptible to wear and shortening the die life. The width W of the tapered surface 72 along the axial direction may be set to a value in the range from about 1.5 mm to 2.5 mm.

The punch 66 can be elevated or lowered by a machine press, not shown. The machine press has a ram (not shown) to which a vertically movable member 82 is connected (see FIG. 3). The vertically movable member 82 is vertically movable in unison with the ram. The punch 66 is fixed to the vertically movable member 82 by a jig 86.

The second form 15 whose shank 7 is inserted in the shank insertion region 44 of the forging die apparatus 30 thus constructed is processed by a third cold forging step, i.e., backward extrusion, as follows: The shank 7 has its distal end held against the distal end face of the knockout pin 55 when the shank 7 is inserted in the shank insertion region 44.

First, the machine press is actuated to lower the vertically movable member 82 coupled to the ram of the machine press. The punch 66 is also lowered into abutment against the upper surface of the large-diameter portion 14 of the second form 15.

As the punch 66 is further lowered, it causes the large-diameter portion 14 of the second form 15 to extend a predetermined distance backwards (in the direction opposite to the pressing direction of the punch 66). At the same time, the cup forming cavity 56 in the upper die 42 forms a cup 8, and the ridges 70a through 70f of the punch 66 form the ball rolling grooves 17a through 17f in the inner wall surface of the cup 8. The annular tapered surface 72 on the outer circumferential surface of the punch 66 also forms an annular large-diameter portion 76 in the mouth of the inner wall surface of the cup 8.

The annular large-diameter portion 76 is formed circumferentially in the mouth of the inner wall surface of the cup 8 and progressively spreads from the bottom toward the opening. Stated otherwise, an annular tapered surface is formed which progressively spreads toward the mouth of the cup 8, and has a terminal end contiguous to the edge of the mouth of the cup 8.

Figure 2:
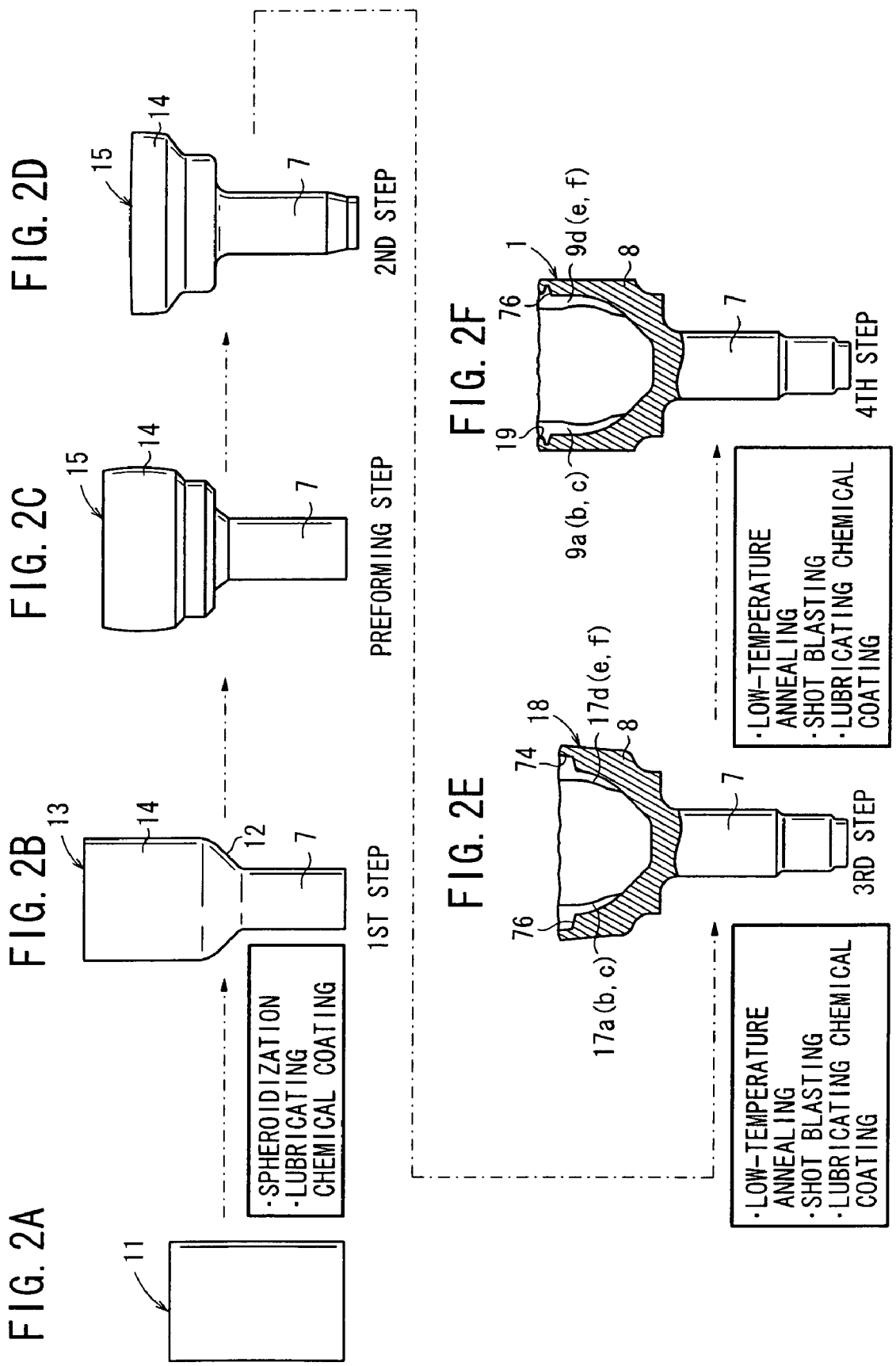
FIGS. 2A through 2F are views illustrative of a process of forging a workpiece, to which the method of manufacturing an outer ring member for a Birfield constant velocity universal joint according to the embodiment is applied.

Thereafter, the punch 66 is elevated in unison with the ram and the vertically movable member 82 by the machine press until the punch 66 leaves the first ring 58, and the knockout pin 55 is elevated to expose the third form 18 (see FIG. 2E).

After third cold forging step S3 is finished, the third form 18 is subjected to a low-temperature annealing process for removing stresses from the third form 18, a shot blasting process (scale removing process) for removing oxide scales, etc. produced by the low-temperature annealing process, and a bonderizing process for forming a lubricating chemical coating made of zinc phosphate or the like on the outer surface of the third form 18, in fourth preparatory step Ssub4. These various processes allow the third form 18 to be easily plastically deformed by an ironing process in the next step.

According to the present embodiment, before the final ironing process is carried out, it is not necessary to perform a mark removing process for removing an annular ridge 19 formed on the edge of the inner surface of the cup 8 of the third form 18 and projecting radially inwardly.

Specifically, in the shot blasting process performed on the third form 18, an annular ridge 19 as a projected mark is formed in the mouth of the inner wall surface in the opening of the cup 8 by steel balls ejected at a high speed and stirred. However, since the annular large-diameter portion 76 has been formed in the mouth of the inner wall surface of the cup 8 in the previous step, i.e., the third cold forging step, an ironing punch, not shown, can smoothly be inserted into the cup 8 in the next step even though the annular ridge 19 projecting in the mouth of the cup 8 is not removed.

Stated otherwise, according to the present embodiment, even though the annular ridge 19 is formed as a mark in the mouth of the cup 8, the mouth is formed contiguously to the annular large-diameter portion 76 which functions as a clearance out of contact with the ironing punch, not shown, in the previous step, and the inside diameter of the annular ridge 19 projecting in the mouth is greater than the maximum outside diameter of the forming portion of the ironing punch. Therefore, the ironing punch, not shown, can be inserted into the opening of the cup 8 without fail.

Figure 5:
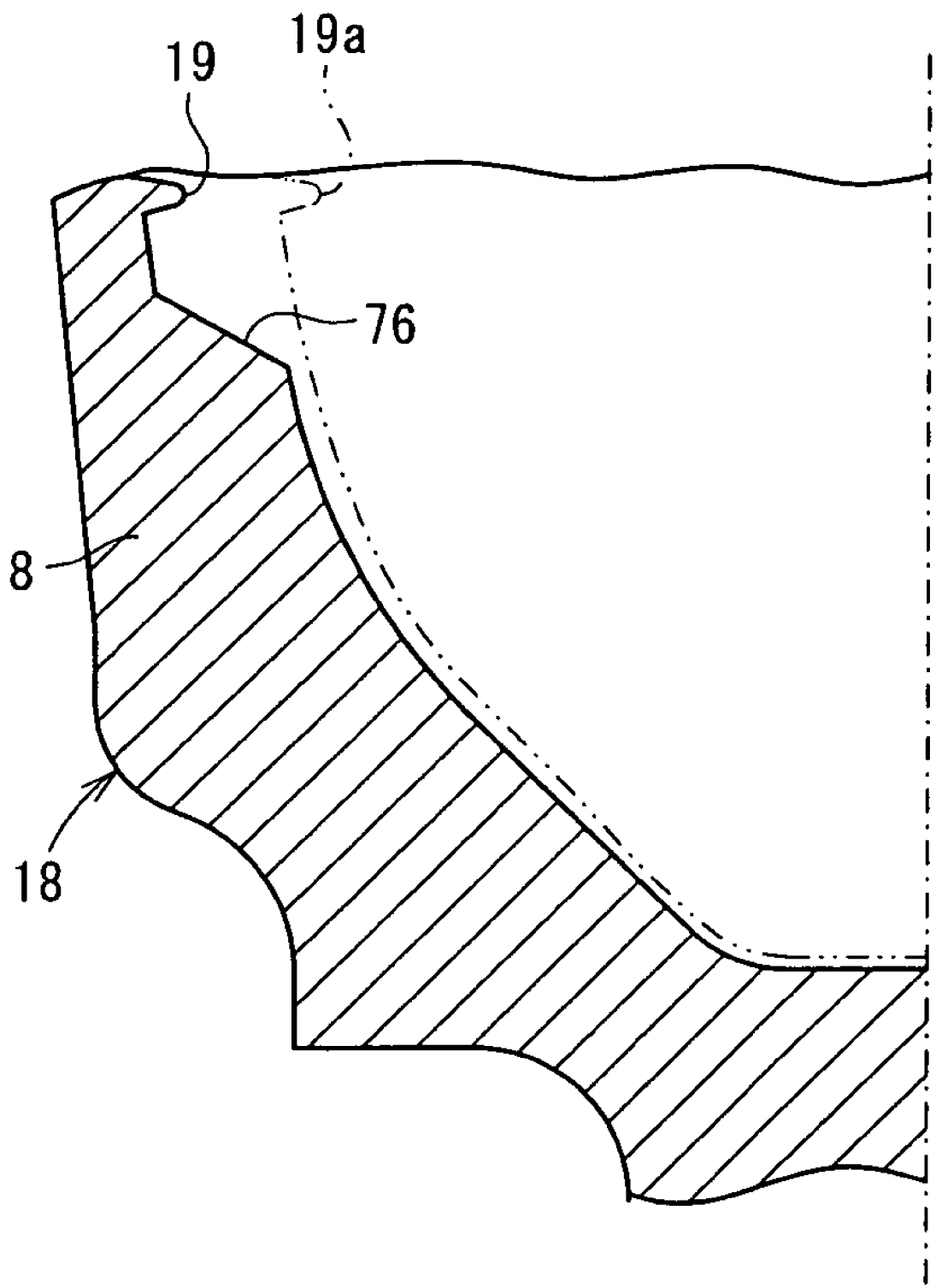
FIG. 5 is a vertical cross-sectional view, partly omitted from illustration, showing for comparison a state in which an annular ridge as a mark is formed in the mouth of a cup produced by the method of manufacturing an outer ring member for a Birfield constant velocity universal joint according to the embodiment of the present invention and a state in which an annular ridge as a mark is formed in the mouth of a cup produced by the background art.

FIG. 5 shows the annular ridge 19, indicated by the solid lines, formed as a projecting mark in the mouth in combination with the annular large-diameter portion 76 according to the present embodiment, and also shows the annular ridge 19a, indicated by the two-dot-and-dash lines, formed as a projecting mark in the mouth according to the background art. It can be seen that the annular ridge 19 according to the present embodiment is displaced a given distance radially outwardly from the inner wall surface of the cup 8 compared with the annular ridge 19a according to the background art.

Finally, an ironing step (final sizing step), i.e., a fourth forging step, is carried out by a fourth forging die, not shown, to finish the third form 18 to a final product shape, thereby producing an outer ring member 1 for a Birfield constant velocity universal joint.

Specifically, the cup 8 is machined to make the wall thickness of the cup 8 and the depth of the ball rolling grooves 17a through 17f equal to desired dimensions. In this manner, the outer ring member 1 (see FIG. 2F) for a Birfield constant velocity universal joint wherein the dimensional accuracy of the cup 8 including the shapes of the ball rolling grooves 9a through 9f, etc. is achieved, is produced. At the same time, a central hole is formed in the shank 7 by a protrusion (not shown) on the distal end of a knockout pin (not shown) of the fourth forging die.

After the forging process for the outer ring member for a Birfield constant velocity universal joint has fully been finished, the end face of the mouth of the cup 8 is cut by lathing or the like to remove burrs and the annular ridge 19 as the mark. The outer ring member 1 (see FIG. 8) for a Birfield constant velocity universal joint is now obtained as a completed product.

In the manufacturing method according to the present embodiment, the annular large-diameter portion 76 is formed as a projecting mark by the scale removing process (shot blasting process) performed on the third form 18. However, since the annular large-diameter portion 76 has been formed in the mouth of the inner wall surface of the cup 8 in the previous step, i.e., third cold forging step S3, an ironing punch, not shown, can be inserted into the opening of the cup 8 without contacting the annular large-diameter portion 76 in the next step, and hence the mark removing process which has been carried out in the background art is dispensed with. Stated otherwise, the ironing process in fourth cold forging step S4 can be performed while the annular ridge 19 remains to be left as the mark.

In the manufacturing method according to the present embodiment, therefore, as the mark removing process which has been carried out in the background art is not required, the production efficiency can be increased and the manufacturing process is shortened for reducing the manufacturing cost.

In the manufacturing method according to the present embodiment, furthermore, inasmuch as only the annular large-diameter portion 76 may be formed in the mouth of the inner wall surface of the cup 8 in third cold forging step S3, the existing forcing facility can be effectively utilized as it is, and hence the outer ring member 1 for a Birfield constant velocity universal joint can inexpensively be produced without the need for new facility investments.

The above embodiment has been described with respect to the cold forging process. The present invention is not limited to the cold forging process, but may be applied to a warm forging process as shown in FIGS. 6A through 6F.

It can be understood from a comparison between FIGS. 2A through 2F showing the cold forging process and FIGS. 6A through 6F showing the warm forging process that the warm forging process differs from the cold forging process in that the low-temperature annealing process, the shot blasting process, and the lubricating chemical coating process between the third and fourth steps are dispensed with. Other operational details and advantages are the same as those of the cold forging process, and will not be described in detail below.

A method of manufacturing an outer ring member for a tripod constant velocity universal joint according to another embodiment of the present invention will be described below.

The outer ring member for a tripod constant velocity universal joint comprises a tubular cup and a shank integrally formed with the cup. The cup has three track grooves defined in an inner circumferential surface thereof. The track grooves extend in the axial direction of the cup and are circumferentially spaced at equal angular intervals. Rollers are provided so as to roll along the track grooves.

Outer ring members for a tripod constant velocity universal joint which have heretofore been used generally have a shank (male type) integrally projecting from an end of the cup along the axial direction. However, the present invention is also applicable to a female-type outer ring member, not shown, having a hole in which axial serrations (not shown) are disposed on the inner circumferential surface of the shank.

Figure 7:
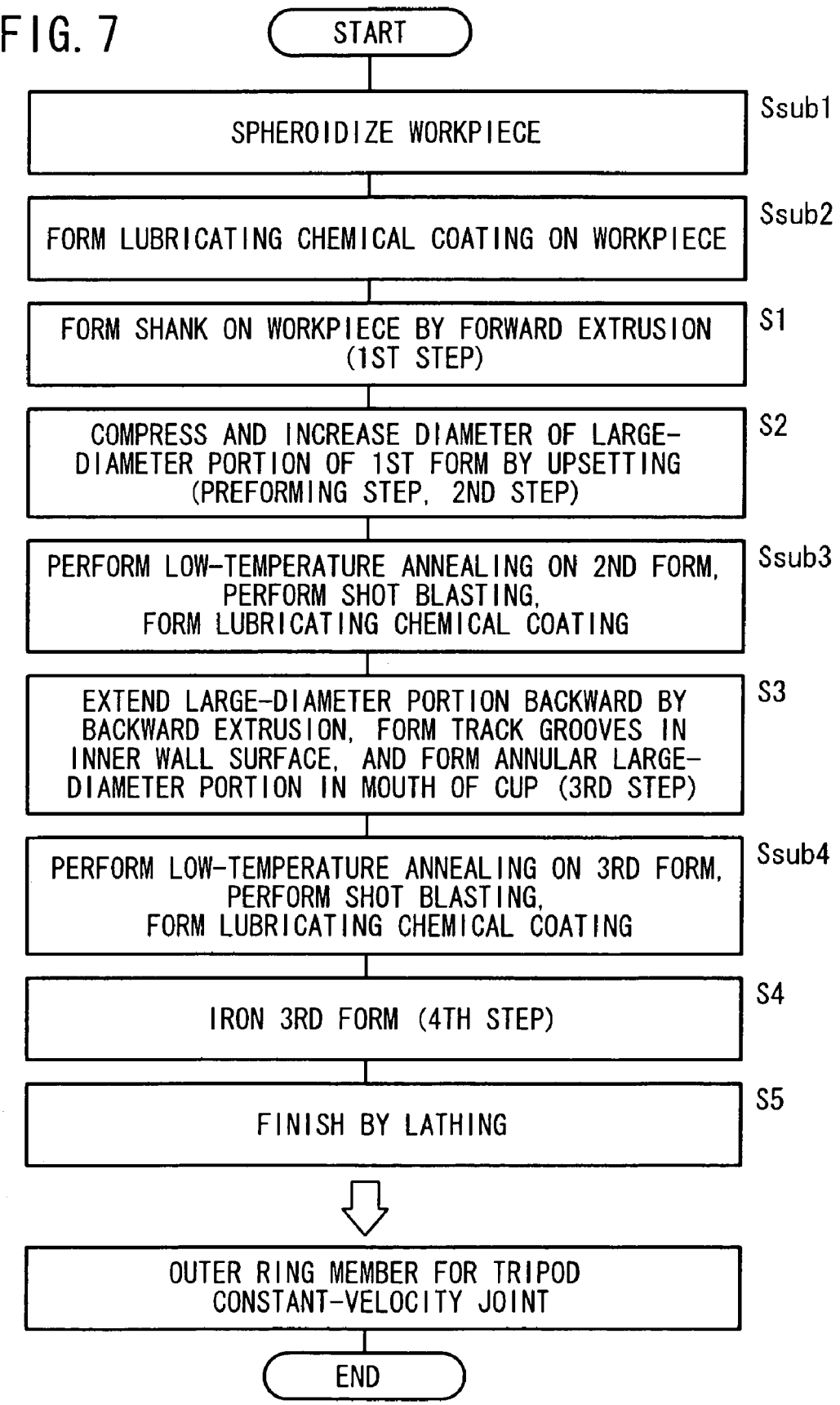
FIG. 7 is a flowchart of a method of manufacturing an outer ring member for a tripod constant velocity universal joint according to another embodiment of the present invention.
Figure 9E:
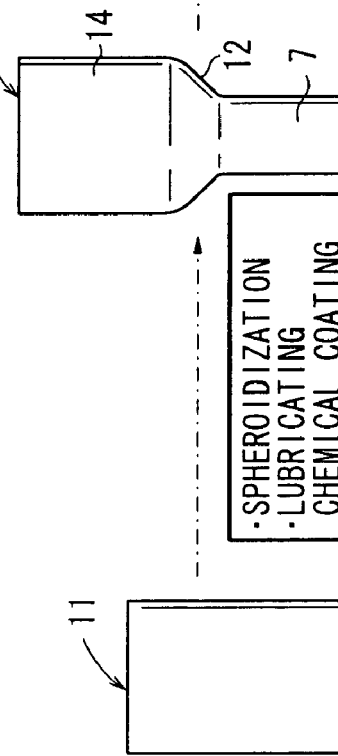
FIGS. 9A through 9E are views illustrative of a process of forging a workpiece according to the background art.
Figure 9C:
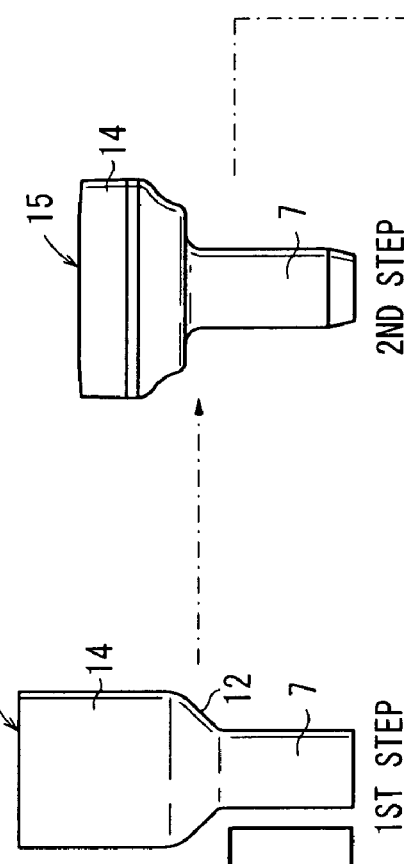
Figure 9D:
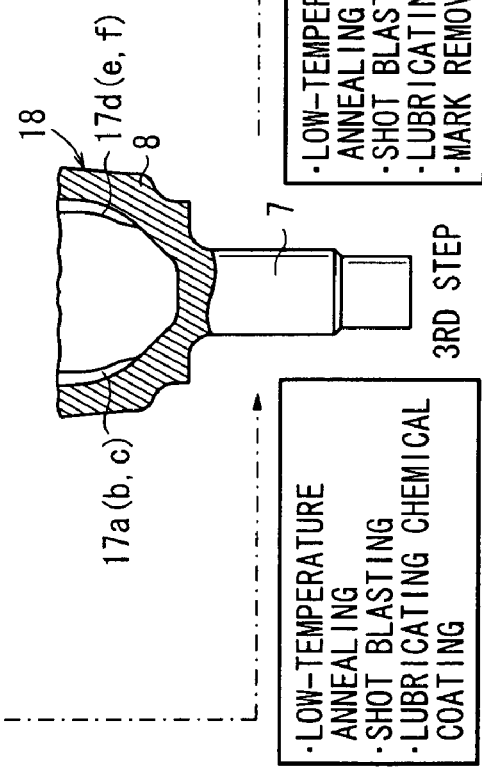
Figure 9B:
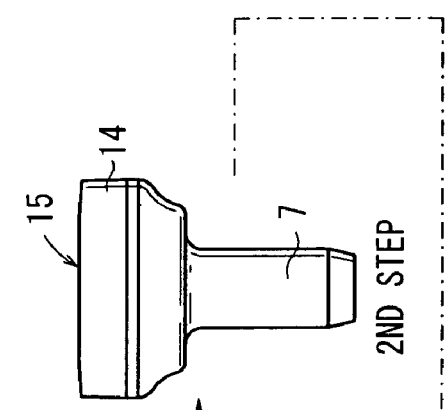
Figure 9A:
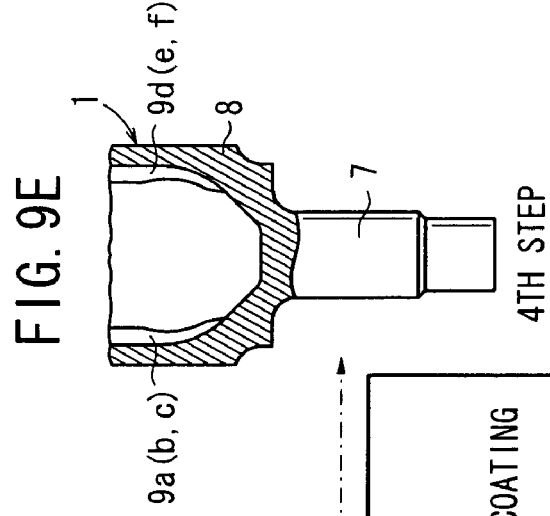
Figure 10:
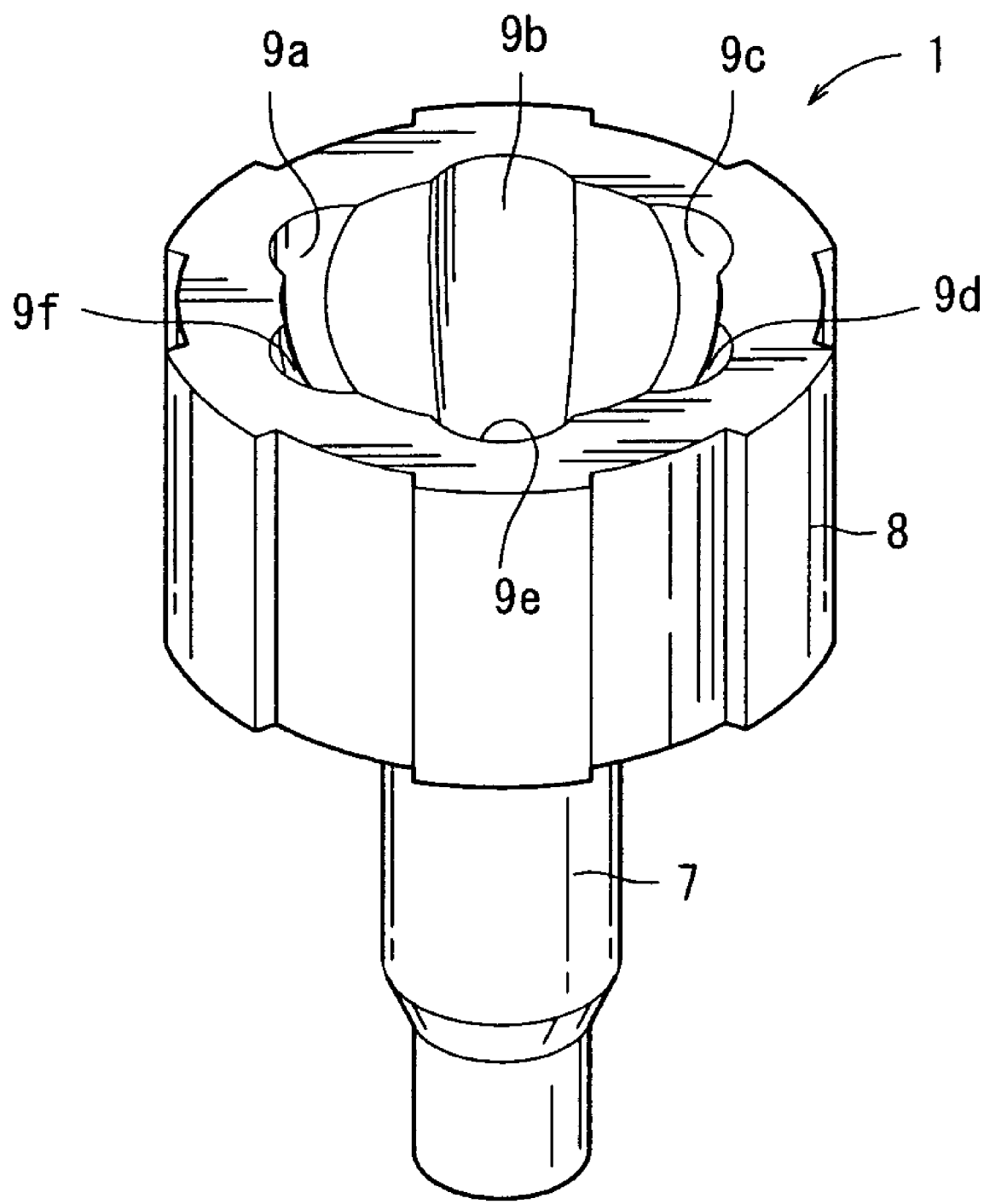
FIG. 10 is an overall schematic perspective view of an outer ring member for a Birfield constant velocity universal joint.
Figure 11:
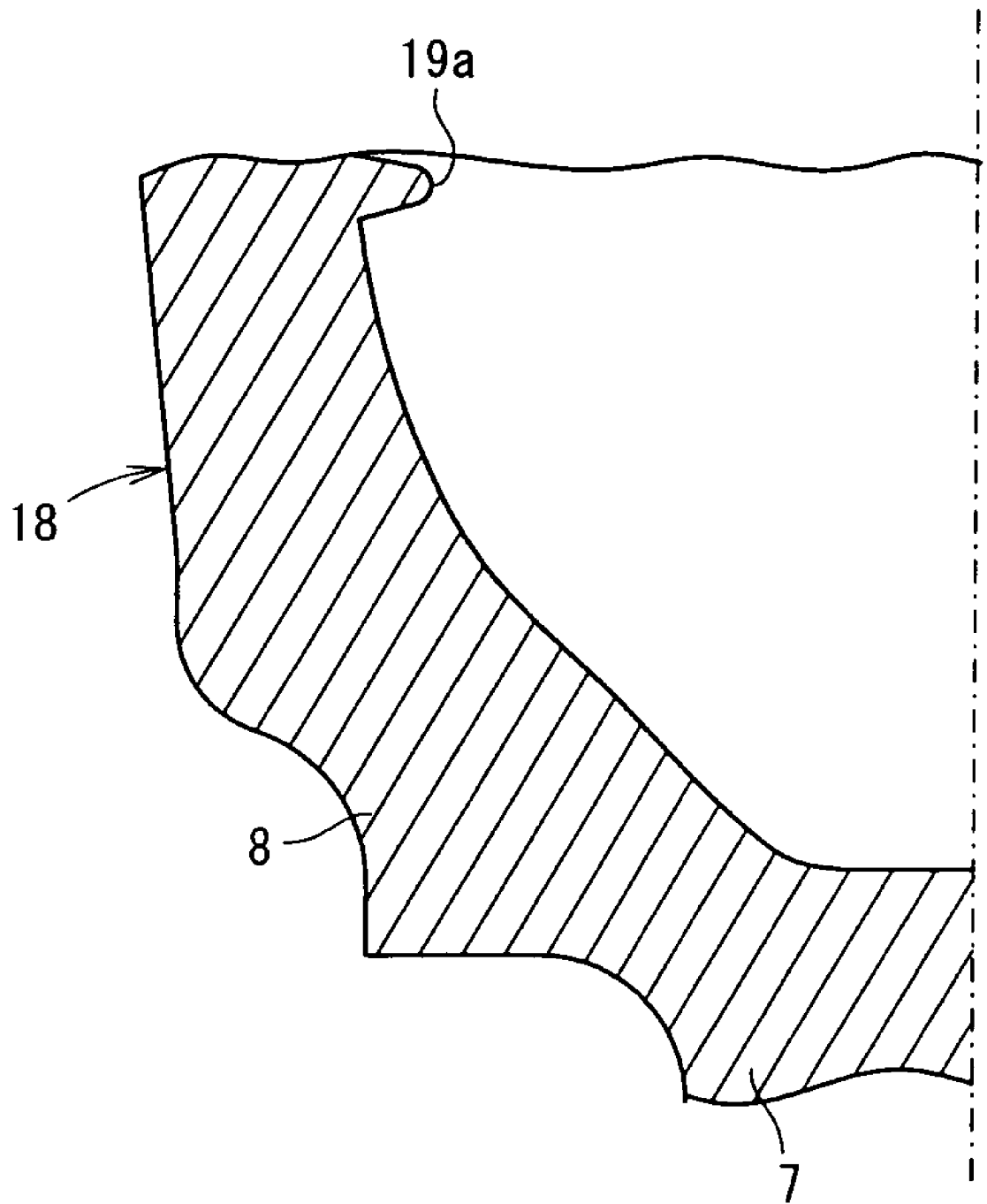
FIG. 11 is a vertical cross-sectional view, partly omitted from illustration, showing a state in which an annular ridge as a mark is formed in the mouth of a cup produced by the background art.

As shown in a flowchart of FIG. 7, the outer ring member for a tripod constant velocity universal joint is manufactured by a method which is substantially the same as the method of manufacturing the Birfield constant velocity universal joint 1 by way of cold forging.

Specifically, after the preparatory steps, i.e., the spheroidizing (annealing) step and the lubricating chemical coating step, forward extrusion is performed on a workpiece 111 (see FIG. 8A) to produce a first form 113 (see FIG. 8B) having a large-diameter portion 114, a tapered reduced-diameter portion 112, and a shank 107. Then, after the first form 113 is preformed, the preform is upset in second cold forging step S2 to compress the large-diameter portion 114 and increase its diameter, producing a second form 115 (see FIG. 8C). After second cold forging step S2 is finished, a preparatory step is performed, followed by third cold forging step S3.

Third cold forging step S3, i.e., backward extrusion, is performed on the second form 115 to form a cup 108 by causing the large-diameter portion 114 of the second form 115 to extend backwards a given distance. At the same time, three track grooves 117a through 117c are formed in the inner wall surface of the cup 108 by ridges of a punch, not shown, and an annular large-diameter portion 176 (see FIG. 8D) is formed in the mouth of the inner wall surface of the cup 108 by an annular tapered surface on the outer circumferential surface of a punch, not shown. The annular large-diameter portion 176 is circumferentially formed in the mouth of the inner wall surface of the cup 108 and progressively spread from the bottom toward the opening.

After third cold forging step S3 is finished, fourth preparatory step Ssub4 is performed. Then, in a shot blasting process performed on the third form 118, an annular ridge 119 is formed as a projected mark in the mouth of the inner wall surface in the opening of the cup 108 by steel balls ejected at a high speed and stirred. However, since the annular large-diameter portion 176 has been formed in the mouth of the inner wall surface of the cup 108 in the previous step, i.e., the third cold forging step, an ironing punch, not shown, can smoothly be inserted into the cup 108 in the next step even when the annular ridge 119 projecting in the mouth of the cup 108 is not removed.

Finally, an ironing step (final sizing step), i.e., a fourth forging step, is carried out by a fourth forging die, not shown, to finish the third form 118 to a final product shape, thereby producing an outer ring member 100 for a tripod constant velocity universal joint.

The other embodiment is the same as the previous embodiment for forming the outer ring member 1 for a Birfield constant velocity universal joint except that it does not require a mark removing process for removing the annular ridge 119 as a mark integrally projecting radially inwardly from the edge of the inner wall surface of the cup 108 of the third form 118 before the final ironing step is performed.

When the outer ring member 100 for a tripod constant velocity universal joint is produced, tapers, not shown, which progressively spread axially outwardly away from the shank may be formed on the ends of inner wall surfaces projecting between the circumferential track grooves 117a through 117c in the mouth of the cup 108 of the outer ring member 100 for a tripod constant velocity universal joint in order to make an operating angle set as the angle between the two shafts, not shown, greater than with the outer ring member 1 for a Birfield constant velocity universal joint.

In addition, as is the case with the outer ring member 1 for a Birfield constant velocity universal joint, the outer ring member 100 for a tripod constant velocity universal joint may be manufactured by a warm forging process.

The invention claimed is:

1. A method of manufacturing an outer ring member for a constant velocity universal joint having a shank and a cup which are formed integrally with each other, comprising the steps of:
    forming a cup having an annular large-diameter portion which is circumferentially formed in a mouth of an inner wall surface of the cup and progressively spreads from a bottom toward an opening thereof, when the cup with grooves is formed by a backward extrusion process; and
    performing an ironing process on the cup, wherein before the cup is ironed, an annular ridge is formed as a mark in the mouth of the cup by a shot blasting process performed on a form.

2. A method according to claim 1, wherein the annular large-diameter portion comprises an annular tapered surface which progressively spreads toward the mouth of the cup, the tapered surface having a terminal end contiguous to an edge of the mouth of the cup.

3. A method according to claim 1, wherein the annular ridge having an inside diameter greater than the maximum outside diameter of a forming portion of an ironing punch.

4. A method according to claim 1, wherein the backward extrusion process and the ironing process are carried out by a cold forging process or a warm forging process.

5. A method according to claim 1, wherein the outer ring member comprises an outer ring member for a Birfield constant velocity universal joint or an outer ring member for a tripod constant velocity universal joint.

* * * * *